(12) United States Patent
Yue

(10) Patent No.: US 8,349,225 B2
(45) Date of Patent: Jan. 8, 2013

(54) METHOD FOR MANUFACTURING LIGHT GUIDE PLATE HAVING LIGHT SCATTERING MICROSTRUCTURES

(75) Inventor: Guo-Han Yue, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/185,671

(22) Filed: Jul. 19, 2011

(65) Prior Publication Data

US 2011/0272834 A1    Nov. 10, 2011

Related U.S. Application Data

(62) Division of application No. 12/317,991, filed on Dec. 31, 2008, now Pat. No. 8,011,819.

(30) Foreign Application Priority Data

Jul. 21, 2008 (CN) .......................... 2008 1 0302865

(51) Int. Cl.
*B29D 11/00* (2006.01)
(52) U.S. Cl. ........ 264/1.24; 264/1.37; 264/2.5; 264/400
(58) Field of Classification Search ................. 264/1.24, 264/1.27, 1.37, 2.5, 400, 482, 219
See application file for complete search history.

(56) References Cited

U.S. PATENT DOCUMENTS

2005/0270802 A1*  12/2005  Hsu et al. ...................... 362/626
2006/0039162 A1*  2/2006   Chen et al. .................... 362/600

* cited by examiner

*Primary Examiner* — Mathieu D. Vargot
(74) *Attorney, Agent, or Firm* — Altis Law Group, Inc.

(57) ABSTRACT

A method for manufacturing a light guide plate includes the follow steps. First, an injection mold including a cavity plate is provided. Then a plurality of microstructures is formed on the cavity plate by laser etching. Each microstructure includes a recess having a concave surface, and a protrusion formed around a periphery of the recess, wherein at least half of the concave surface is a mirror-like surface. Finally, a light guide plate is molded in the injection mold.

14 Claims, 5 Drawing Sheets

METHOD FOR MANUFACTURING LIGHT GUIDE PLATE HAVING LIGHT SCATTERING MICROSTRUCTURES

The present application is a divisional application of U.S. patent application Ser. No. 12/317,991, filed on Dec. 31, 2008, now U.S. Pat. No. 8,011,819.

BACKGROUND

1. Technical Field

The present disclosure relates to a light guide plate for use in a backlight module.

2. Description of Related Art

In a typical liquid crystal display device, a liquid crystal panel of the liquid crystal display device relies on a backlight module powered by electricity to supply the light needed to display images and data.

Currently, backlight modules can be classified as either an edge lighting type or a bottom lighting type depending upon the location of lamps within the device. A typical edge lighting type backlight module includes a light source and a light guide plate. The light guide plate includes a light input surface located at a side surface thereof, a light output surface adjoining the light input surface, and a reflecting surface positioned opposite the light output surface. The light source is generally positioned at the light input surface of the light guide plate. The light guide plate may have a plurality of light scattering microstructures positioned on the reflecting surface. The plurality of scattering microstructures can sufficiently scatter light, thereby improving the optical uniformity of the backlight module.

However, the plurality of scattering microstructures is generally printed or chemically etched on the reflecting surface. As a result, each of the scattering microstructures has a large size because of a low machining precision of the printing or chemical etching, and each of the scattering microstructures is generally brighter than an area around the scattering microstructure. Thus, light spots of the scattering microstructures often occur.

In order to reduce or eliminate the light spots of the scattering microstructures, the backlight module further includes a light diffusion film positioned on top of the light guide plate, and prism sheets positioned on top of the light diffusion film. Light emitted from the light guide plate is scattered by the light diffusion film, condensed by the prism sheets, and emitted from the backlight module. However, an air gap exists at the boundary between the light diffusion film and the light guide plate. When the backlight module is in use, instead of all of the light emitted from the light guide plate passing through the air gap, some of the light undergoes total reflection at one or both of the corresponding boundaries. In addition, the light diffusion film may absorb some of the light emitted from the light guide plate. As a result, the brightness of the backlight module is decreased.

What is needed, therefore, is a new light guide plate and a backlight module that overcome the above-mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
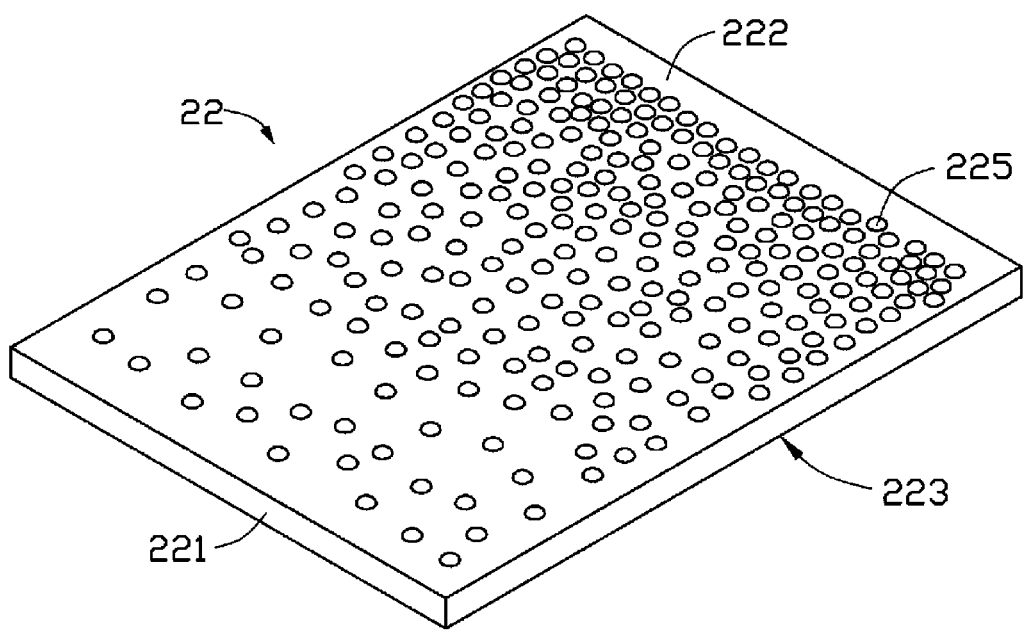
FIG. 1 is an isometric view of an embodiment of a light guide plate.

Referring to FIG. 1, an embodiment of a light guide plate 22 is a transparent plate, and includes a light input surface 221 located at a side surface of the light guide plate 22, a light output surface 222 adjoining the light input surface 221, and a reflecting surface 223 opposite the light output surface 222. The light guide plate 22 includes a plurality of light scattering microstructures 225 irregularly distributed on the light output surface 222. A density of the plurality of scattering microstructures 225 increases with increasing distance from the light input surface 221.

Figure 2:
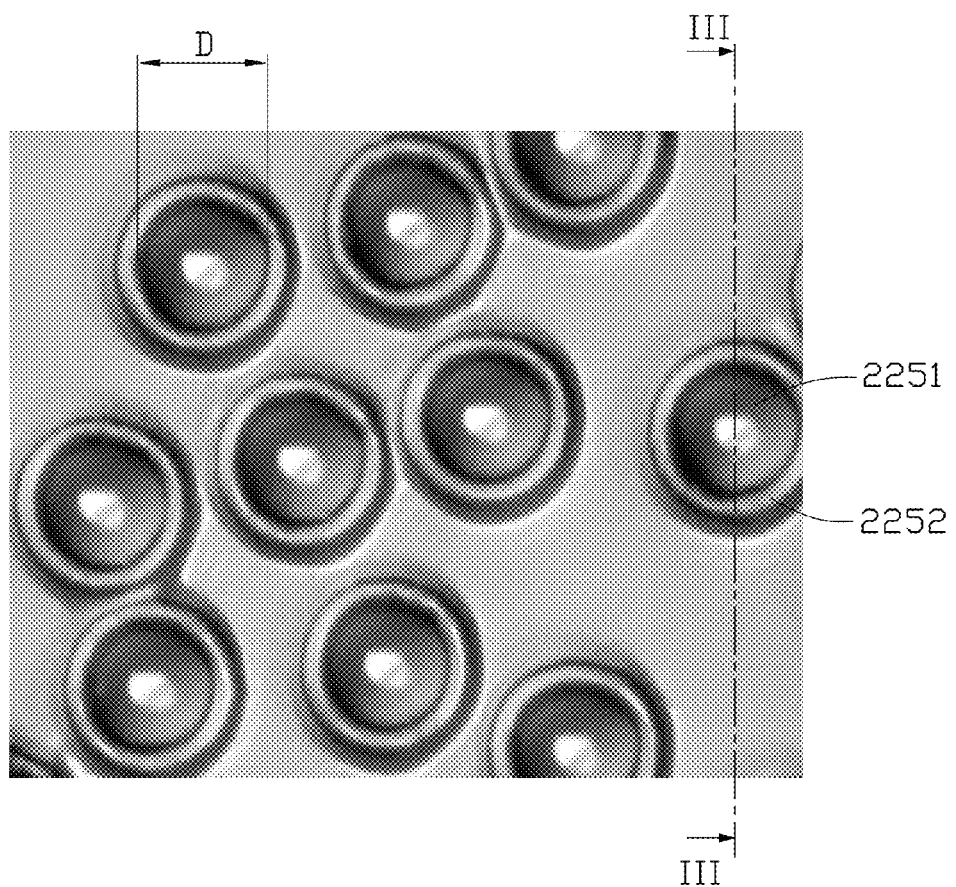
FIG. 2 is an electron micrograph of a portion of the light guide plate of FIG. 1.
Figure 3:
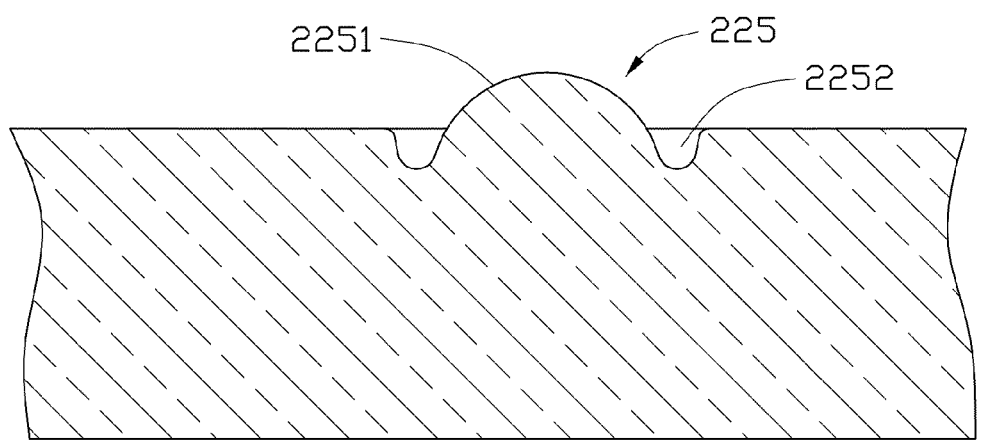
FIG. 3 is a cross-sectional view of the portion of the light guide plate of FIG. 2, taken along line III-III thereof.

Referring also to FIGS. 2 and 3, each scattering microstructure 225 includes a spherical protrusion 2251 having a substantially spherical surface, and a substantially ring-shaped groove 2252 defined around a periphery of the spherical protrusion 2251. At least half of the spherical surface is as smooth as a mirror. In the present embodiment, at least 90% of the substantially spherical surface is as smooth as a mirror. A maximum width D of each spherical protrusion 2251 is less than or equal to 0.06 millimeters. In other embodiments, the plurality of scattering microstructures 225 may be formed on the reflecting surface 223, or formed on both of the light output surface 222 and the reflecting surface 223. In still other embodiments, the spherical protrusions 2251 of the scattering microstructures 225 may be substituted by other various, suitable protrusions, such as conical protrusions or frustum protrusions.

An embodiment of a method for manufacturing the light guide plate 22 includes the following steps. Depending on the embodiment, certain of the steps described below may be omitted, others may be added, and the sequence of steps may be altered.

Figure 4:
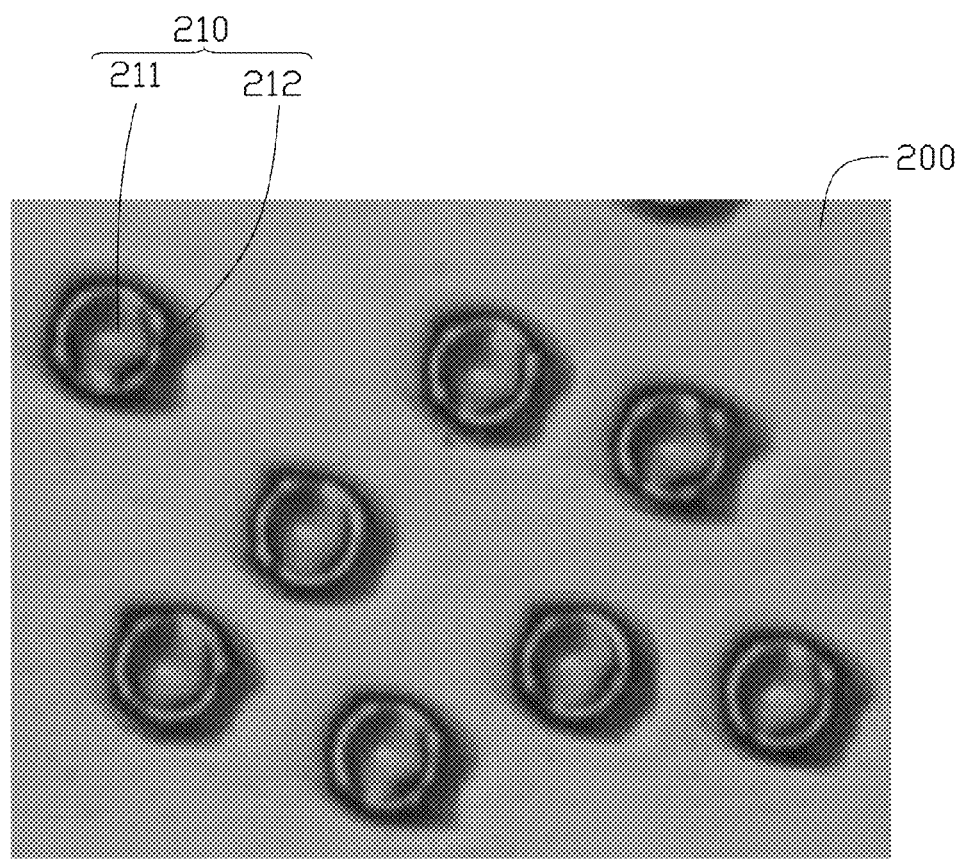
FIG. 4 is an electron micrograph of a portion of a cavity plate for manufacturing the light guide plate of FIG. 1.

First, an injection mold (not shown) including a cavity plate 200 (shown in FIG. 4) is provided.

Next, a plurality of microstructures 210 is formed on the cavity plate 200 by laser etching. Each microstructure 210 defines a substantially spherical recess 211 having a concave surface, and a substantially ring-shaped protrusion 212 formed around a periphery of the spherical recess 211. At least half of the concave surface is as smooth as a mirror. In the illustrated embodiment, the laser light is emitted via a neodymium-doped yttrium aluminum garnet (Nd-YAG) laser. The wavelength of the laser light is in a range from about 1000 nanometers to about 1500 nanometers, and preferably, about 1064 nanometers. The laser light is focused on the cavity plate 200, rapidly increasing a temperature of the focus point. As a result, the cavity plate 200 material at the focus point disintegrates due to high temperature oxidation, thus forming the spherical recess 211. Simultaneously, the cavity plate 200 material around the focus point is melted, forming the ring-shaped protrusion 212.

Finally, the light guide plate 22 is molded in the injection mold. The spherical protrusions 2251 are formed on the light guide plate 22 corresponding to the spherical recesses 211 of the cavity plate 200, and the ring-shaped grooves 2252 are defined in the light guide plate 22 corresponding to the ring-shaped protrusions 212 of the cavity plate 200.

The light guide plate 22 may be made from a material such as polycarbonate, polymethyl methacrylate, polystyrene, copolymer of methylmethacrylate and styrene, and any suitable combination thereof. In alternative embodiments, the laser etching may be performed by a ruby laser, an alexandrite laser, and so on. The wavelength of the laser light may also be selected from other desired values, such as 266 nanometers, 355 nanometers, 532 nanometers, and so on. The smaller the wavelength of the laser light, the less the maximum width of each scattering microstructure 225.

When the light guide plate 22 is used in a backlight module, light is projected from a light source to the light input surface 221 of the light guide plate 22. When the light travels to any one of the scattering microstructures 225, some of the light is reflected and refracted by the ring-shaped groove 2252, thereby preventing the light from escaping directly out of the light guide plate 22. The light becomes adjusted by the ring-shaped groove 2252, and travels to the spherical protrusion 2251. Some of the adjusted light is refracted at the spherical surface of the spherical protrusion 2251, and travels out from the spherical surface. Some of the adjusted light is reflected at the spherical surface. Because most of the spherical surface is as smooth as a mirror, some of the reflected adjusted light is not reflected as diffused light, but reflected directly into the light guide plate 22 along a predetermined direction. Then some of the reflected adjusted light is reflected via the reflecting surface 223, and finally travels out from the light guide plate 22 via an area around the scattering microstructure 225, thereby increasing a brightness of the area around the scattering microstructure 225. In addition, the plurality of scattering microstructures 225 have a very small size due to a high machining precision of the laser etching. Thus light spots of the scattering microstructures 125 are reduced or eliminated. Accordingly, the backlight module using the light guide plate 22 has high optical uniformity.

Moreover, the plurality of scattering microstructures 225 are irregularly positioned on the light output surface 222, thus decreasing occurrences of interference lines on the light output surface 222 adjacent the light source. Since the density of the plurality of scattering microstructures 225 increases with increasing distance from the light input surface 221, a brightness of an area on the light output surface 222 away from the light input surface 221 is improved, further improving the optical uniformity of the backlight module.

Figure 5:
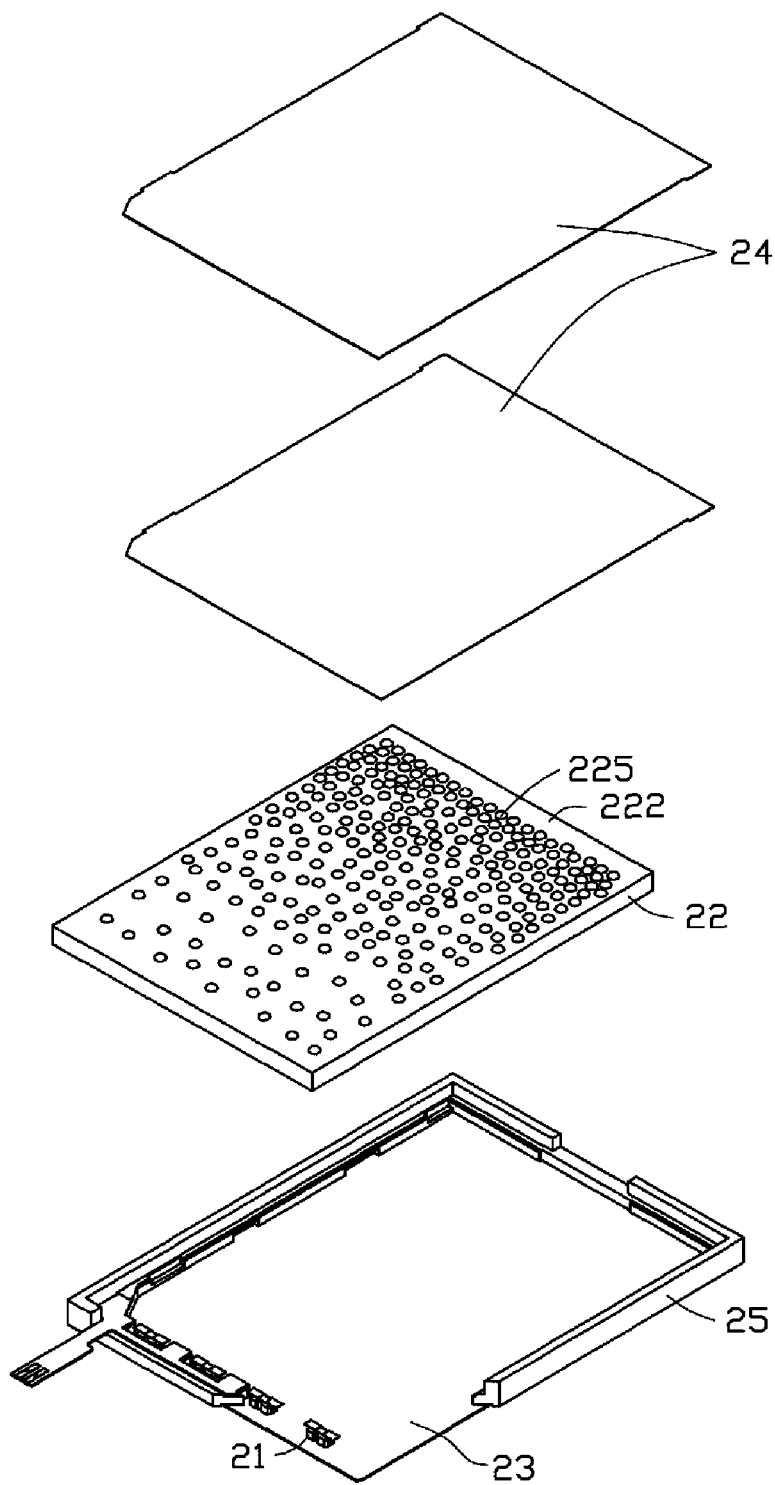
FIG. 5 is an exploded, isometric view of an embodiment of a backlight module adopting the light guide plate of FIG. 1.

Referring to FIG. 5, an embodiment of a backlight module 20 includes a light source 21, the light guide plate 22, a reflecting sheet 23 positioned below the light guide plate 22, a pair of prism sheets 24 positioned on top of the light guide plate 22, and a frame 25 for positioning the above components. The light source 21 is positioned adjacent to the light input surface 221 of the light guide plate 22. In the present embodiment, the light source 21 may be a cold cathode fluorescent lamp. In another embodiment, the light source 21 may be a plurality of light emitting diodes arranged in a straight line. The reflecting sheet 23 can reflect light emitted from the light guide plate 22 back into the light guide plate 22, thus improving a light energy utilization rate. The prism sheets 24 can condense light to emit the light at a relatively small light emitting angle, thus increasing the optical brightness of the backlight module 20.

Since light emitted from the light guide plate 22 is uniform and does not need to be diffused, a light diffusion film can be omitted from the backlight module 20. In such case, the light emitted from the light guide plate 22 travels to the prism sheets 24 directly, and does not undergo total reflection or absorption at a gap that would normally exist between the light diffusion film and the light guide plate 22. Thus the light energy utilization rate is increased significantly. In the present embodiment, the light energy utilization rate is increased by about 30%. In addition, the light emitting from the light guide plate 22 travels to the prism sheets 24 directly, without being diffused by any light diffusion film. Thus, the light emitting angle of the prism sheets 24 is small, to promote the light condensing effect of the prism sheets 24. Moreover, because the light diffusion film is omitted, the backlight module 20 has a low cost and a reduced thickness.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A method for manufacturing a light guide plate, the method comprising:
   providing an injection mold comprising a cavity plate;
   forming a plurality of microstructures on the cavity plate by laser etching, each microstructure defining a substantially spherical recess having a concave surface, and a substantially ring-shaped protrusion formed around a periphery of the spherical recess, wherein at least half of the concave surface is a mirror-like surface; and
   molding a light guide plate in the injection mold, wherein the light guide plate comprises a light input surface, a light output surface adjoining the light input surface, and a reflecting surface opposite the light output surface; at least one of the light output surface and the reflecting surface forms a plurality of substantially spherical protrusions corresponding to the plurality of substantially spherical recesses of the cavity plate, and a plurality of substantially ring-shaped grooves corresponding to the plurality of substantially ring-shaped protrusions of the cavity plate; each of the plurality of ring-shaped grooves is defined around a periphery of corresponding one of the plurality of spherical protrusions, and at least half of an outer surface of the plurality of spherical protrusions is a mirror-like surface.

2. The method for manufacturing a light guide plate of claim 1, wherein a laser light used for the laser etching is emitted by a neodymium-doped yttrium aluminum garnet laser.

3. The method for manufacturing a light guide plate of claim 2, wherein the wavelength of the laser light is in a range from about 1000 nanometers to about 1500 nanometers.

4. The method for manufacturing a light guide plate of claim 3, wherein the wavelength of the laser light is about 1064 nanometers.

5. The method for manufacturing a light guide plate of claim 1, wherein the light guide plate is made from material selected from the group consisting of polycarbonate, polymethyl methacrylate, polystyrene, copolymer of methylmethacrylate and styrene, and any combination thereof.

6. The method for manufacturing a light guide plate of claim 1, wherein a laser light used for the laser etching is emitted by a ruby laser.

7. The method for manufacturing a light guide plate of claim 1, wherein a laser light used for the laser etching is emitted by an alexandrite laser.

8. The method for manufacturing a light guide plate of claim 6, wherein the wavelength of the laser light is in a range from about 266 nanometers to about 532 nanometers.

9. The method for manufacturing a light guide plate of claim 6, wherein the wavelength of the laser light is in a range from about 266 nanometers to about 355 nanometers.

10. The method for manufacturing a light guide plate of claim 6, wherein the wavelength of the laser light is in a range from about 355 nanometers to about 532 nanometers.

11. The method for manufacturing a light guide plate of claim 7, wherein the wavelength of the laser light is in a range from about 266 nanometers to about 532 nanometers.

12. The method for manufacturing a light guide plate of claim 7, wherein the wavelength of the laser light is in a range from about 266 nanometers to about 355 nanometers.

13. The method for manufacturing a light guide plate of claim 7, wherein the wavelength of the laser light is in a range from about 355 nanometers to about 532 nanometers.

14. A method for manufacturing a light guide plate, the method comprising:

providing an injection mold comprising a cavity plate;

forming a plurality of microstructures on the cavity plate by laser etching, each microstructure defining a substantially spherical recess having a concave surface, and a substantially ring-shaped protrusion formed around a periphery of the spherical recess, wherein at least half of the concave surface is a mirror-like surface; and molding a light guide plate in the injection mold, wherein a major surface of the molded light guide plate comprises a plurality of light scattering microstructures, each of the plurality of light scattering microstructures comprising a spherical protrusion and a ring-shaped groove surrounding the spherical protrusion, the spherical protrusion and the ring-shaped groove corresponding to the spherical recess and the ring-shaped protrusion of a respective one of the plurality of microstructures of the cavity plate, wherein at least half of the spherical protrusion is as smooth as a mirror.

* * * * *